United States Patent
Chang Gun

[11] Patent Number: 5,318,087
[45] Date of Patent: Jun. 7, 1994

[54] SNOW CHAIN DEVICE FOR A MOTOR VEHICLE TIRE

[75] Inventor: Kim Chang Gun, Kyunggi, Rep. of Korea

[73] Assignee: Rocket Electric Co., Ltd., Los Angeles, Calif.

[21] Appl. No.: 13,848

[22] Filed: Feb. 5, 1993

[51] Int. Cl.$^5$ .................................................. B60C 27/08
[52] U.S. Cl. ................................... 152/241; 152/245; 152/222; 152/219
[58] Field of Search ............... 152/167, 170, 173, 175, 152/177, 213 R, 213 A, 217, 219, 221, 222, 231, 239, 241, 245

[56] References Cited

U.S. PATENT DOCUMENTS

| | | | |
|---|---|---|---|
| 1,533,679 | 4/1925 | Webster | 152/219 |
| 2,740,449 | 4/1956 | Erving | 152/243 |
| 4,366,850 | 1/1983 | Coutts | 152/243 X |
| 4,416,318 | 11/1983 | Rieger et al. | 152/219 X |
| 4,513,801 | 4/1985 | Pedrick et al. | 152/213 R |
| 4,830,078 | 5/1989 | Chang | 152/243 X |
| 4,836,259 | 6/1989 | Lewin et al. | 152/243 X |

FOREIGN PATENT DOCUMENTS

| | | |
|---|---|---|
| 12882 | 5/1933 | Australia . |
| 0208209 | 8/1989 | Japan . |

Primary Examiner—Michael W. Ball
Assistant Examiner—Francis J. Lorin
Attorney, Agent, or Firm—Lawrence I. Field

[57] ABSTRACT

A snow chain for a motor vehicle tire which consists of a pair of side cables, a plurality of cross cables between the pair of side cables and connected to the side cables by connectors. Rotatably disposed grippers on the cross cables. Deformation of the connectors and damage to the tire is prevented by the insertion of a rubber ring on the cross cable between the grippers and the connector. One direction slippage (skid) is prevented by forming a space of "t" between axially disposed protrusions on the grippers disposed on the cross cables and means to join the ends of each of the side cables to one another.

8 Claims, 5 Drawing Sheets

SNOW CHAIN DEVICE FOR A MOTOR VEHICLE TIRE

FIELD OF THE INVENTION

This invention relates to a snow chain device for a motor vehicle tire and more particularly to a snow chain assembly for a motor vehicle tire which prevents slippage on an icy road or a snow covered road and which provides effective braking function and running safety, when a motor vehicle is running on an icy road or a snow covered road.

BACKGROUND OF THE INVENTION AND PRIOR ART

Previously known tire chains have numerous disadvantages, including heavy weight, breakage and damage to tires when in use and inconvenience in transporting the same.

Conventional snow chains include tire chain structures comprising a plurality of metal rings around the tire. Other snow chains have been provided with cross cables and side cables, in which the cross cables have plastic, elastic and flat strip shapes which serve as antiskid bodies. Other known tire chains include chains in which both ends of the cross cables are fixedly connected with the side cables by rivets, or other fasteners. Still other chains are known, made of flat strips of elastic materials. Tire chains made with flat strips of elastic materials such as plastics are light in weight, convenient to transport and also do not break or damage the tires on which they are mounted. In spite of these advantages, the flat strip shaped, elastic material chains are not widely used because:

The shape of the cross cables tend to stay flat, forcing the side cables apart, not conforming to the cross section of the tire, making it hard to tighten the chains around the tire so that they will remain in position during use.

The (elastic) material of which the cross cables are made does not slide easily over the tread of the tire, High frictional forces between the tire and the elastic material of the cross cable, make it hard to keep the cross cables evenly spaced and tighten the chain.

The fixed connection between the cross cables and the side cables become bent and deformed when assembeling the chains to the tire causing the chains to be even harder to tighten.

Japanese Utility Model Publication No. 1990-2643 (published on Jan. 23, 1990) discloses a cross member comprising a wire cable and a plurality of ball bodies mounted on the wire cable. This cross member has advantages for readily mounting on the tire and reducing noise, but the structure possesses no effective antiskid function.

U.S. Pat. No. 4,660,611 ("Tire Chain", patented on Apr. 28, 1989) describes an improved tire chain employing heat treated medium carbon steel elements assembled including a pair of side members, fastening means to secure one end of each side member to the other end, and a plurality of cross chains extending between the side wall members at preselected intervals. The tire chain is considerably more durable, but the structure provides no effective anti-skid functions.

SUMMARY OF THE INVENTION

The major object of the present invention is to overcome the defects in the prior art and to provide a snow chain device for a motor vehicle tire in which effective braking function and running safety are obtained by mounting the device tightly on the outer side and inner side of a tire in a simple operation and which effectively prevents slippage on an icy road or a snow covered road.

In order to accomplish the major object of the invention, the invention provides a snow chain device for a motor vehicle tire which comprises: a pair of side cables mounted along the outer side and inner side of a tire and a plurality of cross cables spacingly connected to said side cables across the tread portion of a tire and fixed by connectors to the pair of side cables. Breakage of the chain and damage to the tire are prevented by inserting rubber rings between grippers on the cross cables and the connectors, one direction slippage being prevented by forming a space "t" on axially disposed projections when the rollers are mounted and grasping tightly on the contacting surface of the road.

As described in the description which follows, the tire chain of the present invention comprises the following in combination:

(1) a pair of side cables, (2) cross cables carrying rotatable rollers for spacing the cross cables from the tire sidewalls and the tire tread, (3) rotatable road contacting gripping members also carried by the cross cables, (4) connectors securing the cross cables to the side cables, (5) means to adjust the tension in the side cables, and (6) means at the ends of each side cable to connect the ends to each other.

In such structures according to the invention, the grippers, for example, can be provided as polygonal, preferably square shaped grippers (quad grippers) from which these are projected extensions only on one side axial direction, a plurality of grooves being formed to be circumscribed with projections and a plurality of projecting arms. Further, the grippers can be provided with extensions on both side directions, and circular shaped projecting portions between the extensions. In this case, when the grippers are disposed on the cross cables, the extensions are opposingly contacted toward one another and the space of "t" is formed as shown in FIGS. 3 and 8.

BRIEF DESCRIPTION OF THE DRAWINGS

Preferred embodiments of the invention are illustrated by way of example in the accompanying drawings wherein.

DESCRIPTION OF THE PREFERRED EMBODIMENTS

Figure 1:
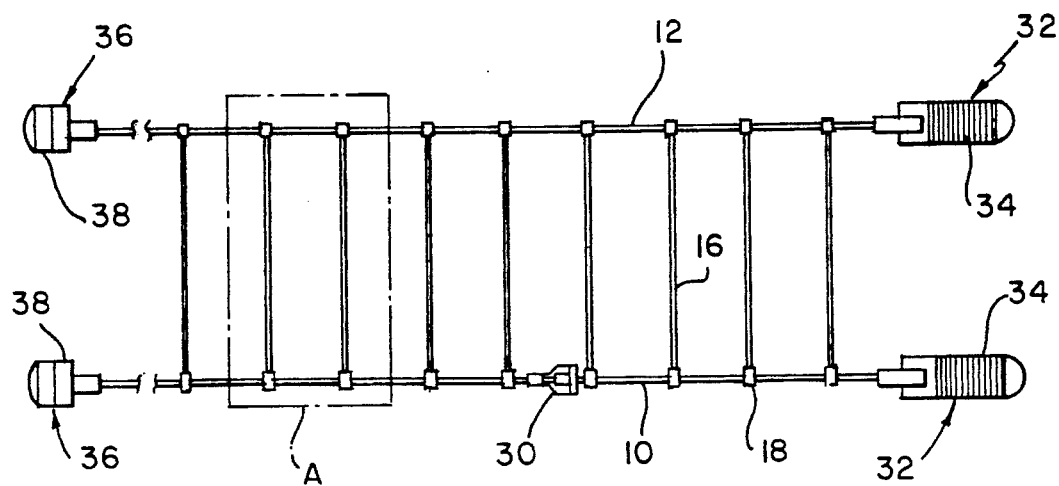
FIG. 1 is a plan view of a snow chain device according to the invention showing the device lying flat on the ground in a open state.
Figure 2:
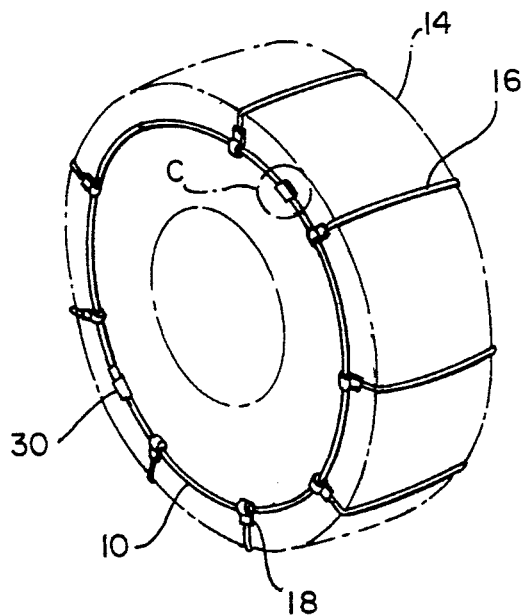
FIG. 2 is a perspective view of the snow chain device of the invention in use on a tire.
Figure 3:
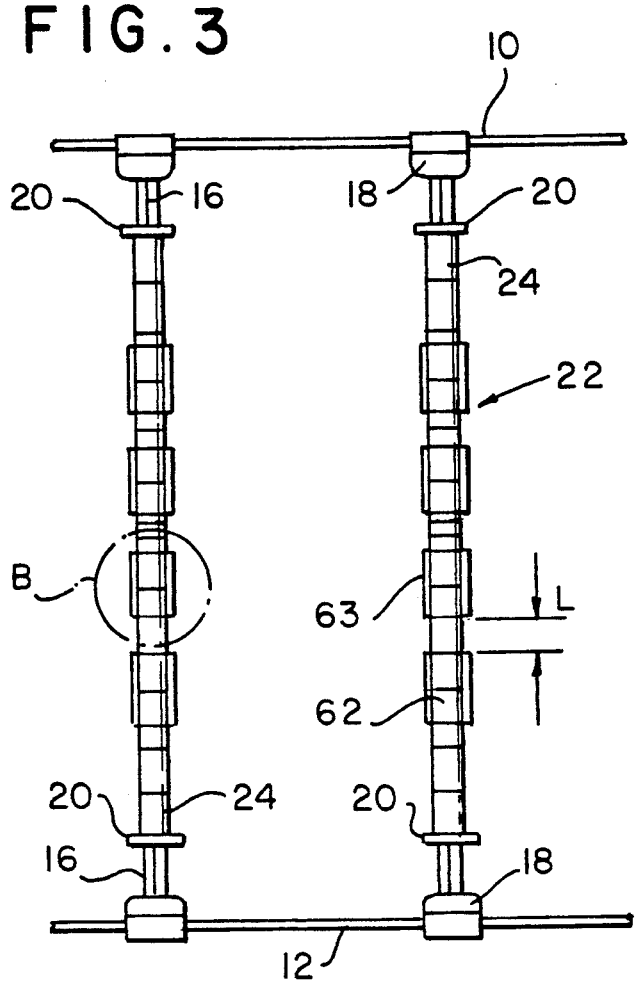
FIG. 3 is an enlarged perspective view of portion A of FIG. 1.
Figure 10:
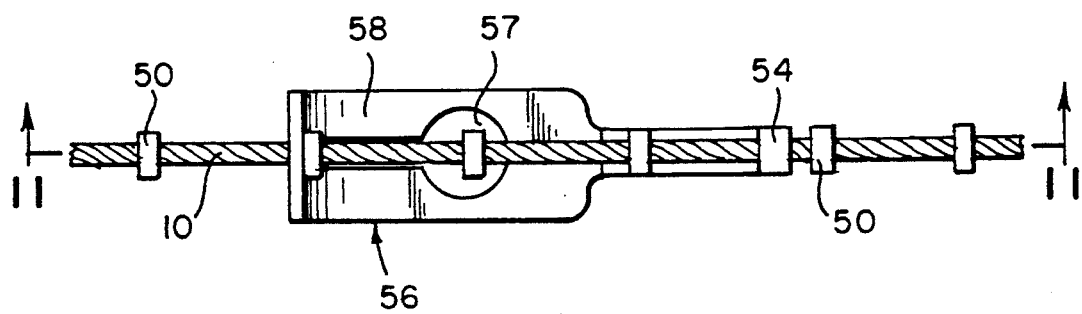
FIG. 10 is an enlarged plan view like FIG. 6 of a modified securing means for a snow chain device according to the invention.
Figure 12:
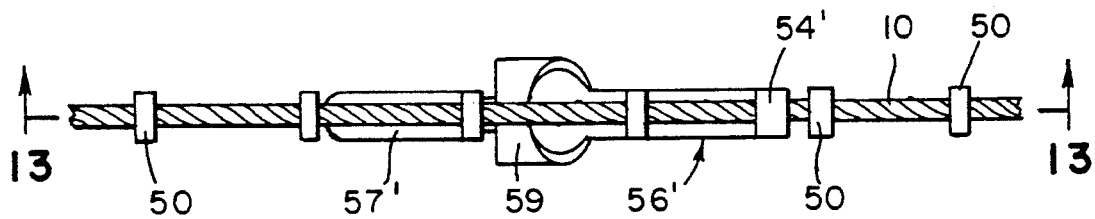
FIG. 12 is an enlarged plan view of still another type of securing means for a snow chain device of the invention.

FIG. 1 is a plan view showing the entire structure of the improved snow chain device for a motor vehicle tire prior to use. In FIGS. 1, 10 and 12 indicate a pair of side cables to be mounted along both sidewalls (outer sidewall and inner sidewall) of a tire 14 (FIG. 2). The side cables are connected to each other by a plurality of cross cables 16 which are spaced along the length of the side cables and are fixedly connected by connectors 18 to both side cables 10 and 12 (FIG. 3). The cross cables 16 span the tread portion of a tire 14 when the snow chain device is mounted on a tire 14 as shown in FIG. 2.

Figure 2A:
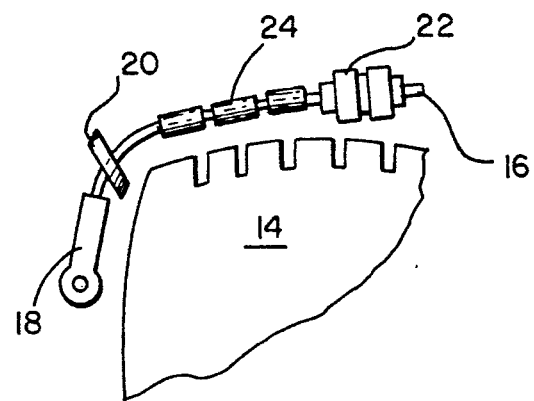
FIG. 2A is an enlarged fragmentary view of a portion of the cross cable on the tire.

Rubber rings 20, grippers 22 and bushings 24 are rotatably mounted on cross cables 16, as shown in FIGS. 2A and 3. The rubber rings 20 roll where the sidewall and tread meet to prevent damage to the outer sidewall and inner sidewall of the tire 14 by the burr occurring on the connector 18 owing to friction (contact) of the connectors 18 and the grippers 22 or bushing 24.

Figure 4:
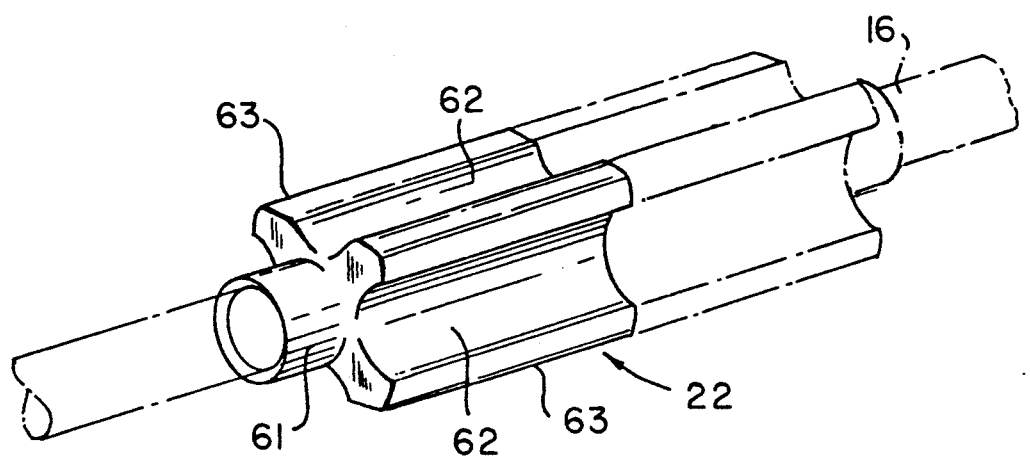
FIG. 4 is an enlarged perspective view of portion B of FIG. 3.
Figure 8:
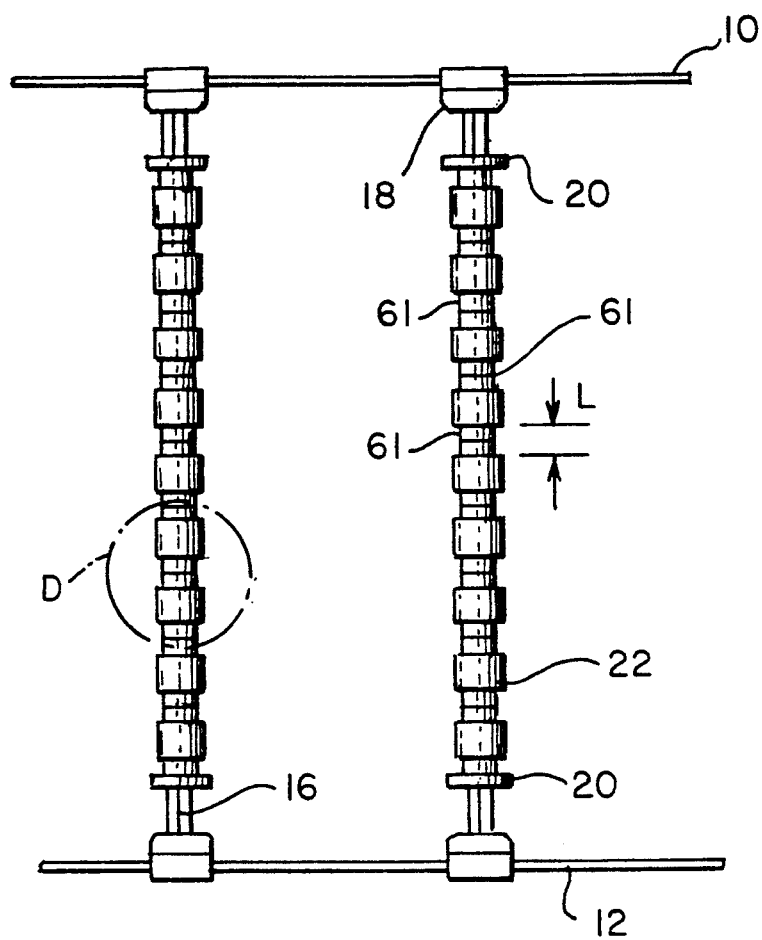
FIG. 8 is an enlarged perspective similar to FIG. 3 showing a modified cross cable.
Figure 9:
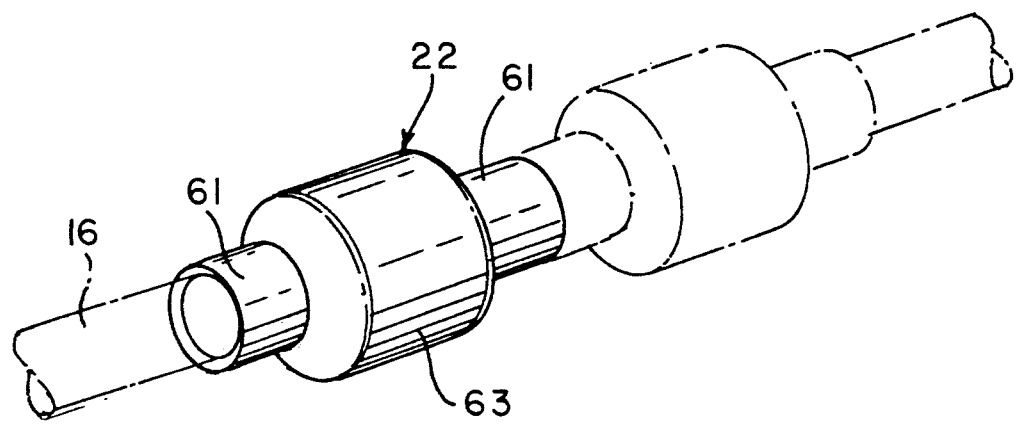
FIG. 9 is an enlarged perspective view of part D in FIG. 8.

Grippers 22 may be formed in various shapes. FIG. 4 shows a polygonal gripper 22 and FIG. 9 shows a cylindrial gripper 22'. In the gripper shown in FIG. 4, an extension 61 is provided at one end to maintain a spacing "t" between adjacent pairs of rollers, Gripper 22 includes projecting arms 63 which extend from the body of the roller. A groove 62 is formed between the projecting arms 63 of the gripper 22, Gripper 22 is readily formed by casting and machining any suitable material, preferably a metal. The cylindrical grippers 22' shown in FIG. 9 are provided with extensions 61a in the axial direction on both sides of the body and the body has an enlarged circular diameter between the extensions on the body. When the grippers 22 are inserted onto the cross cables 16 the projections 61 (or 61a) of one gripper contact the projection on the next adjacent gripper so that a space "t" is maintained between the outermost portions of pairs of adjacent grippers as shown in FIGS. 3 and 8.

Figure 6:
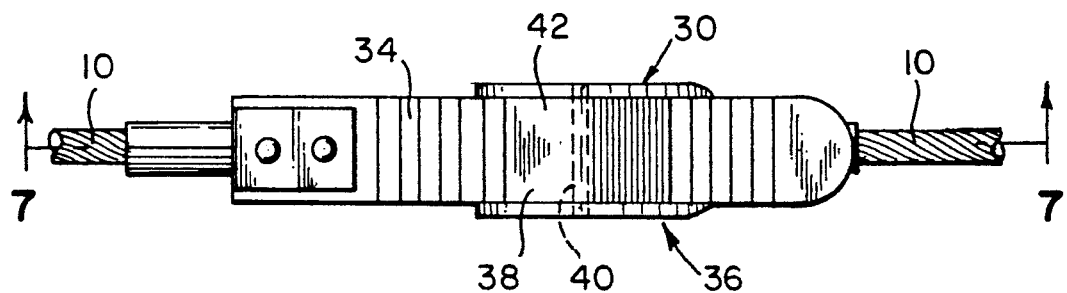
FIGS. 6 and 7 are enlarged views of part C of FIG. 2, FIG. 6 being a plan view and FIG. 7 being a cross-sectional view of the device of FIG. 6 taken on plane 7—7.
Figure 7:
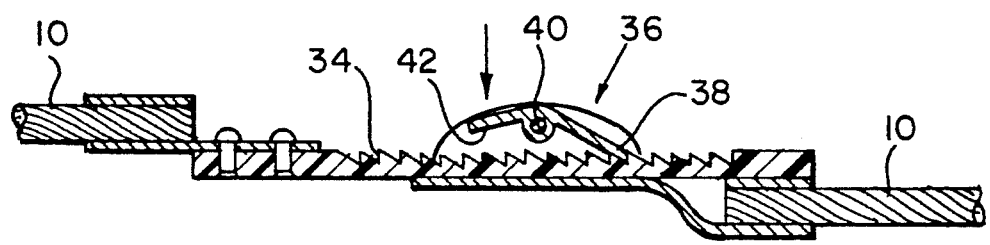

Securing means C are provided to join the ends of each of the side cables 10 and 12 as shown in FIG. 2. One form of the securing means (shown in FIGS. 5, 6 and 7) includes plastic tongue pieces 32 on one end of each of the side cables 10 and 12. A plurality of tooth shaped projections 34 are formed on one surface of each tongue piece 32. A fastening member 36 is fixed to each of the other ends of the side cables and includes stopper 38 on the member 36 and an axially disposed stub shaft 40. A torsion spring 42 is axially mounted on the stub shaft 40 in order to operate the stopper 38, as shown in FIG. 7.

Figure 11:
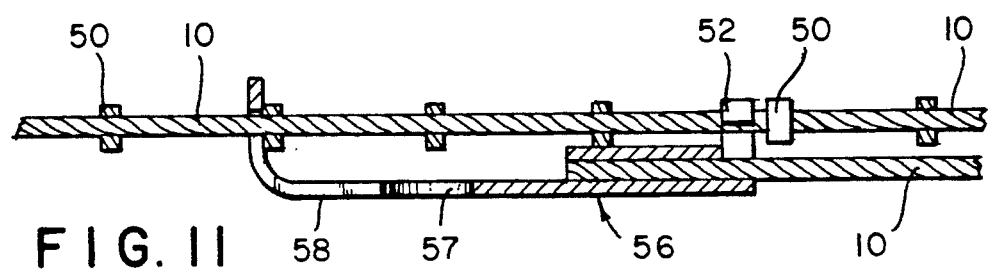
FIG. 11 is a section view of the device of FIG. 10 taken on plane 11—11.

FIGS. 10 and 11 show one embodiment for securing the ends of the side cables to each other. A plurality of stoppers 50 are spacingly fixed to one end of the side cables 10 and 12 and a connecting piece 56, is secured to other end of each of the side cables, wherein a hole 57 is formed on the middle portion of the connecting piece 56 and a rectangle hole 58 is formed, opposite the fixed end of the connecting piece 56 and connected to the hole 57.

Figure 13:
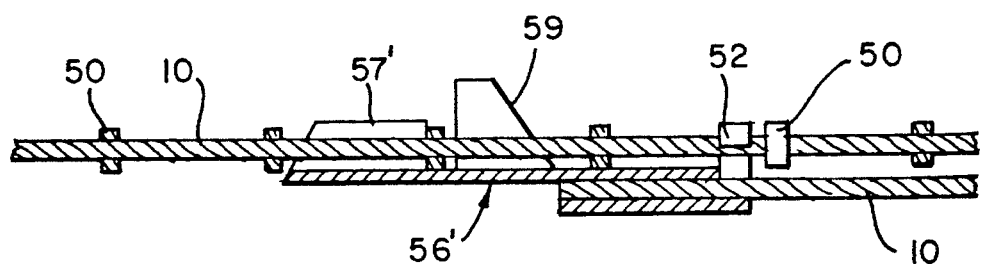
FIG. 13 is a sectional view of the device of FIG. 12 taken on plane 13—13.

FIGS. 12 and 13 show another embodiment of the securing means according to the invention. A plurality of stoppers 50 are spacingly fixed to one end of the side cables 10 and 12. The connecting piece 56', is secured to the other end. An annular ring 59 is formed on the middle portion of the connecting piece 56' and a square, U-shaped groove 57' is formed opposite the fixed end of the connecting in 56'.

The securing means shown in FIGS. 10 and 11, and in FIGS. 12 and 13 are the same on the one end of the side cable that has stoppers 50 spacingly fixed to it. In both embodiments, the other end of the side cable is fastened to a stamped metal part that has two functions, namely:

1. It provides an adjustable means to hold the side cable tightly around the various tire sizes, and 2. It provides a "hook" 52 to keep the free end of the side cable in position.

The difference between the two designs is the way the parts 56 and 56' are made. Part 56 has a round opening in the center with a rectangular opening intersecting the round opening and pointed away from the end that is fixed to the side cable. The hole is larger in diameter than the outside diameter of the stoppers 50 and the slot is narrower than the outside diameter of the stoppers 50 and larger in diameter than the side cables.

The person using the chain pulls the side cable through the hole 57 in the connecting piece 56 and, when the side cable is tight, slides the cable into the rectangular hole 58 a Stopper 50 will not go through the rectangular opening, therefore, the side cable is held in position.

Next, the free end of the side cable is positioned under the hook 52 to keep it from banging around in use.

Part 56' replaces the round and rectangular holes with two formed "U" shapes. The "U" shape at the center of the part is wider than the outside diameter of the stoppers 50 and closed at the top of the "U" so that the stopper can enter the "U" from the end toward the end that is secured but can not be removed from the top of the "U". The "U" shape opposite the end that is secured to the side cable is narrower than the outside diameter of the stopper and wider than the diameter of the side cable.

The person using the chain pulls the side cable and stoppers over the both "U" shapes and when the cable is tight pushes the side cable down into the "U" shapes securing the side cable in position.

Then the free end of the cable is placed under the hook.

OPERATION

The operation of the device according to the invention as described above will now be further explained.

Figure 5:
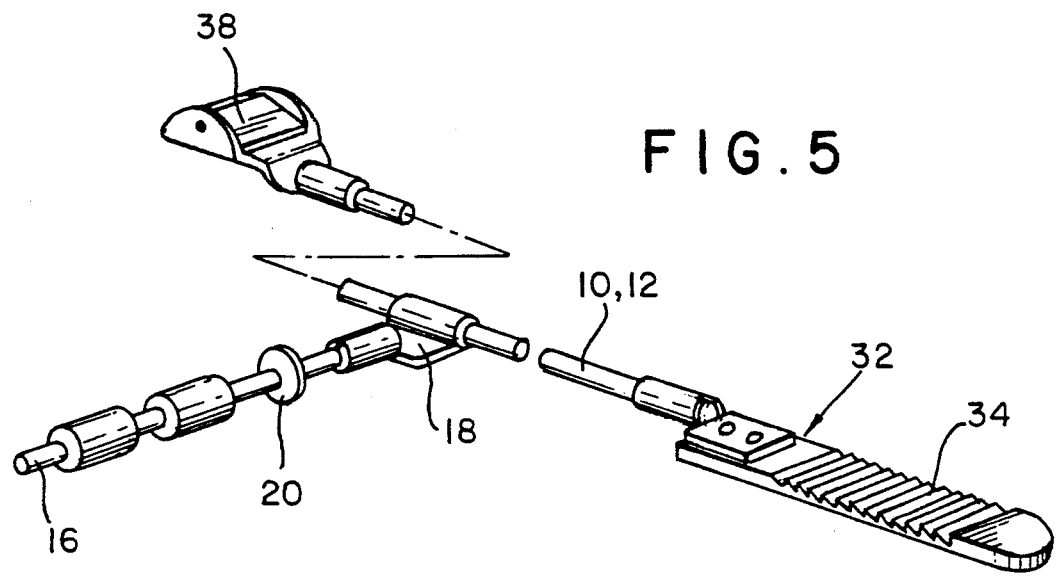
FIG. 5 is an enlarged fragmentary exploded perspective view of a portion of the snow chain device of the invention.

Firstly, the side cables 10 and 12 as shown in FIG. 1 are disposed along the outer sidewall and inner sidewall of the tire 14 with the cross cables lying across the tread of the tire. Then a tongue piece 32, which is formed with a plurality of tooth shaped projections 34 on one end of a side cable, is inserted into the fastening member 36 fixed to other end of side cable as shown in FIGS. 5, 6 & 7. At this time, when the stopper 38, which is axially disposed with shaft 40 on the fastening member 36 is pressed in the arrow direction (FIG. 7), the torsion spring 42, which is elastically supported by the shaft 40, is disposed between the stopper 38 and the fastening member 36, and the tongue piece 32 is inserted between the fastening member 36 and the stopper 38 and then the tongue piece 32 is pulled through member 36 until the slack in the side cable is taken up.

As shown in FIG. 2, it is tensioned to be engaged on the outer side of tire 14 and when the pressed stopper 36 is released one end of the stopper 36 is fixed to the projection 34 of the tongue piece 32.

As a result, the cross cables 16, which are fixedly connected to the connectors 18 on the side cables 10 and 12, are positioned to lie across the tread portion of the tire 14.

Further, the extensions 61 of the grippers 22' are opposingly disposed toward one another and the grippers are rotatably disposed in the axial direction on the cross cables 16. Owing to formation of space "t" by the extensions 61, directional slippage is prevented and the grippers function to "grasp tightly" against the surface of the icy road and the snow covered road when the vehicle is running. In particular, the space "t" is to prevent the slippage in the running direction and slippage to the left and right.

FIGS. 8 and 9 show another embodiment of the grippers 22' according to the invention. The extensions 61 of the circular shaped gripper 22' are opposingly disposed toward one another on the cross cables 16 positioned to lie across the tread, and when the tire 14 is rotatably disposed, as shown in FIG. 2. Damage to the outer sidewall and inner sidewall of the tire 14 by the burr forming due to the friction (contact) of the connectors 18 and the grippers 22 is eliminated by providing rubber rings 20 between the connectors 18 (which are fixedly connected with the side cables 10 and 12) and grippers 22 (which are rotatably disposed on the cross cables 16).

FIGs. 10 and 11 show a plan view and a sectional view of another embodiment of the securing means 30 according to the invention. A plurality of stoppers 50 are spacingly secured to one end of the side cables 10 and 12, and a connecting piece is fixed on the other end, a round hole is formed in the middle position of the connecting piece and a rectangle hole is formed, joining the round hole opposite the fixed end.

In such structures, when the stoppers mounted to the side cables are pulled after insertion into the round hole of the connecting piece and the side cables are mounted tightly on the outer side and/or inner side of the tire, the side cables are pulled past the rectangular hole joined with the round hole, the stoppers fixed to the cable are held by the rectangular hole, the remaining parts of side cables are fixed to the hook shaped part of the connecting piece whereby the remained parts of the side cables are prevented from striking the fender of the vehicles when the vehicles are running.

FIGS. 12 and 13 show another embodiment for the connecting pieces of the securing means. One end of the connecting piece is formed with a hook shaped ring 52 on same end the side cable is fixed, an annular ring is formed in the middle portion of the connecting piece, and a U-shaped groove is formed on the opposed end.

In this embodiment, when the stoppers are pulled toward the axes of the connecting piece and a pair of side cables are mounted tightly on the outer side and/or inner side of the tire, the side cables are inserted into the U-shaped groove and at the same time, the stoppers are fixedly inserted into the annular ring, and the remaining parts of the side cables are fixed under the circular hook shaped ring of the connecting piece whereby the remaining parts are prevented from striking the fender of the vehicles when the vehicles are running.

Mounting and release of the snow chain device of this invention can be carried out quickly on the tire, and when the motor vehicles are running on an icy road and snow covered road the friction on the roads in improved and slippage can be prevented. Accordingly, the snow chain device provides effective braking function and running safety.

A primary function of the securing means 30 is to eliminate the need to position the tire over the snow chain before it can be mounted. The securing means 30 is released, separating the side cable 10 at its center. The side cable 12 is disposed along the inner side wall of the tire and the separated side cable 10 is disposed along the outer side wall of the tire with the separation at the position location where the tire touches the ground. The securing means 30 is re-engaged and the snow chain is mounted to the tire as previously described.

Since various modification changes and and variations may be made of this invention without departing from the spirit and scope of the invention it is intended that it not be limited except as required by the appended claims.

What is claimed is:

1. A snow chain device for a motor vehicle tire which is adapted to be disposed across the tread portion of the tire, and which comprises: a pair of side cables adapted to be disposed along the sidewalls of said tire, a plurality of cross cables attached by connectors to said side cables and extending between said pair of side cables, shaped grippers rotatably mounted on the cross cables, rotatable rubber rings mounted on said cross cables between said grippers and said connectors, wherein damage of said outer side and inner side of the tire by the burr occurring due to contact between said grippers and said connectors is prevented by said rubber rings inserted on said cross cables between said grippers and said connectors, means to prevent one direction slippage by formation of a space between the outermost portions of pairs of adjacent grippers and means to secure the free ends of said side cables to each other.

2. A snow chain device as claimed in claim 1, wherein said means to secure the free ends of said side cables to each other comprises: plastic tongue pieces being fixed to one end of the side cables, a plurality of tooth shaped projections being formed on one side of a surface of each tongue piece and fastening members being fixed to an other end of the side cables wherein stoppers are axially disposed on stub shafts on the fastening members, securing means axially mounted on a torsion spring for operating the stoppers being provided on the stub shafts.

3. A snow chain device as claimed in claim 1, wherein said grippers are square shaped grippers provided with a plurality of grooves in their surface and with an extension at one end of said grippers to provide a space between the outermost portions of adjacent pairs of said grippers.

4. A snow chain device as claimed in claim 1, wherein said grippers are circular grippers having axially extending extensions at both ends of said grippers, said extensions being of a reduced diameter, to provide a space between the outermost portions of adjacent pairs of said grippers. grippers having extensions in an axial of both ends of said grippers, said extension being of a reduced diameter, to provide a space "t" between adjacent pairs of grippers.

5. A snow chain device as claimed in claim 1, wherein said securing means consists of a plurality of stoppers on one end of said pair of side cables and is fastened to a connecting piece on other end of said pair of side cables, and wherein a round hole is formed on the middle position of the connecting piece and a rectangle hole is provided opposite the fixed end connected to the round hole whereby said stoppers, may be fastened.

6. A snow chain device as claimed in claim 1, wherein a connecting piece of said securing means is provided with a hook shaped ring on one side of the connecting piece, and a "U-" shaped groove, closed at the top annular ring provided on a middle portion of the side cable wherein a rectangle U-shaped groove is formed, on the side opposite the fixed end whereby the securing means is achieved.

7. A snow chain device as claimed in claims 1 including means whereby one side cable can be separated to allow mounting without positioning the tire over the snow chain.

8. A snow chain device as claimed in claim 1 including in addition at least one rotatable roller on said cross cables, disposed between said grippers and said rubber ring.

* * * * *